United States Patent
Kendall et al.

(10) Patent No.: US 7,058,963 B2
(45) Date of Patent: Jun. 6, 2006

(54) METHOD AND APPARATUS FOR GENERATING COMMERCIAL VIEWING/LISTENING INFORMATION

(75) Inventors: Scott Allan Kendall, Westfield, IN (US); David Jon Nicoson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 70 days.

(21) Appl. No.: 10/164,873

(22) Filed: Jun. 7, 2002

(65) Prior Publication Data

US 2003/0115587 A1    Jun. 19, 2003

Related U.S. Application Data

(60) Provisional application No. 60/341,731, filed on Dec. 18, 2001.

(51) Int. Cl.
*H04H 9/00* (2006.01)
*H04N 7/16* (2006.01)

(52) U.S. Cl. ............... 725/21; 725/9; 725/133; 725/141; 725/153; 386/46

(58) Field of Classification Search ............ 725/9, 725/21, 133, 141, 88, 102, 153, 20, 22; 386/46; 348/907; 358/908
See application file for complete search history.

(56) References Cited

U.S. PATENT DOCUMENTS

| | | | | |
|---|---|---|---|---|
| 4,750,053 | A | * | 6/1988 | Allen ..................... 358/335 |
| 4,931,865 | A | * | 6/1990 | Scarampi ................ 358/84 |
| 5,495,282 | A | * | 2/1996 | Mostafa et al. ........... 348/5 |
| 5,692,093 | A | * | 11/1997 | Iggulden et al. ......... 386/46 |
| 2001/0037238 | A1 | * | 11/2001 | Gotoh et al. ............. 705/14 |
| 2002/0144262 | A1 | * | 10/2002 | Plotnick et al. .......... 725/32 |
| 2003/0070182 | A1 | * | 4/2003 | Pierre et al. ........... 725/135 |

* cited by examiner

*Primary Examiner*—Ngoc Vu
(74) *Attorney, Agent, or Firm*—Joseph J. Laks; Robert D. Shedd

(57) ABSTRACT

A method for generating commercial information using a data recording device can provide commercial sponsors with feedback regarding the effectiveness of their commercials. According to the method, program data including a commercial is recorded. The recorded program data including the commercial is played back. A trigger event for the commercial is detected during playback. Information identifying the commercial is stored in response to detection of the trigger event.

22 Claims, 6 Drawing Sheets

METHOD AND APPARATUS FOR GENERATING COMMERCIAL VIEWING/LISTENING INFORMATION

This application claims priority to and all benefits accruing from a provisional application filed in the United States Patent and Trademark Office on Dec. 18, 2001, and there assigned Ser. No. 60/341,731.

BACKGROUND OF THE INVENTION

1. Field of the Invention

The present invention generally relates to video and/or audio programming, and more particularly, to a method and apparatus for, among other things, generating commercial viewing/listening information by detecting viewers'/listeners' reactions to commercials.

2. Background Information

Sponsors of video and/or audio programming pay for commercials to be aired in hopes that viewers/listeners will see/hear their advertisements and in turn buy their products and/or services. With respect to video programming, various rating information is frequently used to infer the number of people that watched a given program, and therefore, the number of people that viewed the commercials aired with that program.

With respect to commercials, however, this inference may not be an accurate representation of reality. That is, it is typically impossible to determine from such rating information whether a given commercial is actually viewed. For example, some viewers may activate the mute button on their television, or leave the room to answer the telephone or obtain a snack during certain commercials. Accordingly, rating information is not necessarily an accurate indicator as to whether commercials are actually viewed.

Even assuming that such conventional rating information is an accurate indicator of actual commercial viewing activity, it still fails to provide sponsors with certain valuable information. For example, such conventional rating information fails to indicate whether viewers actually liked and/or intentionally viewed specific commercials. Moreover, such conventional rating information also fails to provide sponsors with the identity and/or contact information of the viewers that liked and/or intentionally viewed their commercials. If such information was available, sponsors could then provide those viewers with advertising literature, coupons, electronic mail, and/or other targeted advertising for the products and/or services advertised in their commercials.

Accordingly, there is a need for a method and apparatus which avoids the aforementioned problems, and is thus capable of generating valuable information for sponsors regarding their commercials and the viewers thereof. The present invention addresses these and other issues.

SUMMARY OF THE INVENTION

In accordance with an aspect of the present invention, a method for generating commercial information using a data recording device is disclosed. According to the method, program data including a commercial is recorded. The recorded program data including the commercial is played back. A trigger event for the commercial is detected during playback. Information identifying the commercial is stored in response to detection of the trigger event.

In accordance with another aspect of the present invention, an apparatus for generating commercial information is disclosed. The apparatus comprises means for recording program data including a commercial, means for playing back the recorded program data including the commercial, and means for detecting a trigger event for the commercial during playback, and for enabling information identifying the commercial to be stored in response to detection of the trigger event.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Like reference numbers indicate like elements or steps throughout the drawings. The exemplifications set out herein illustrate preferred embodiments of the invention, and such exemplifications are not to be construed as limiting the scope of the invention in any manner.

DESCRIPTION OF THE PREFERRED EMBODIMENTS

As previously indicated herein, the present invention is applicable to video and/or audio programming and the commercials included therein. However, for purposes of example and explanation, the present invention will be described herein with reference to programming that includes video data. This description, however, is not intended to limit the applicability of the present invention in any manner. Accordingly, the principles of the present invention may also be applied to programming, such as radio programming, which includes audio data but not video data.

Figure 1:
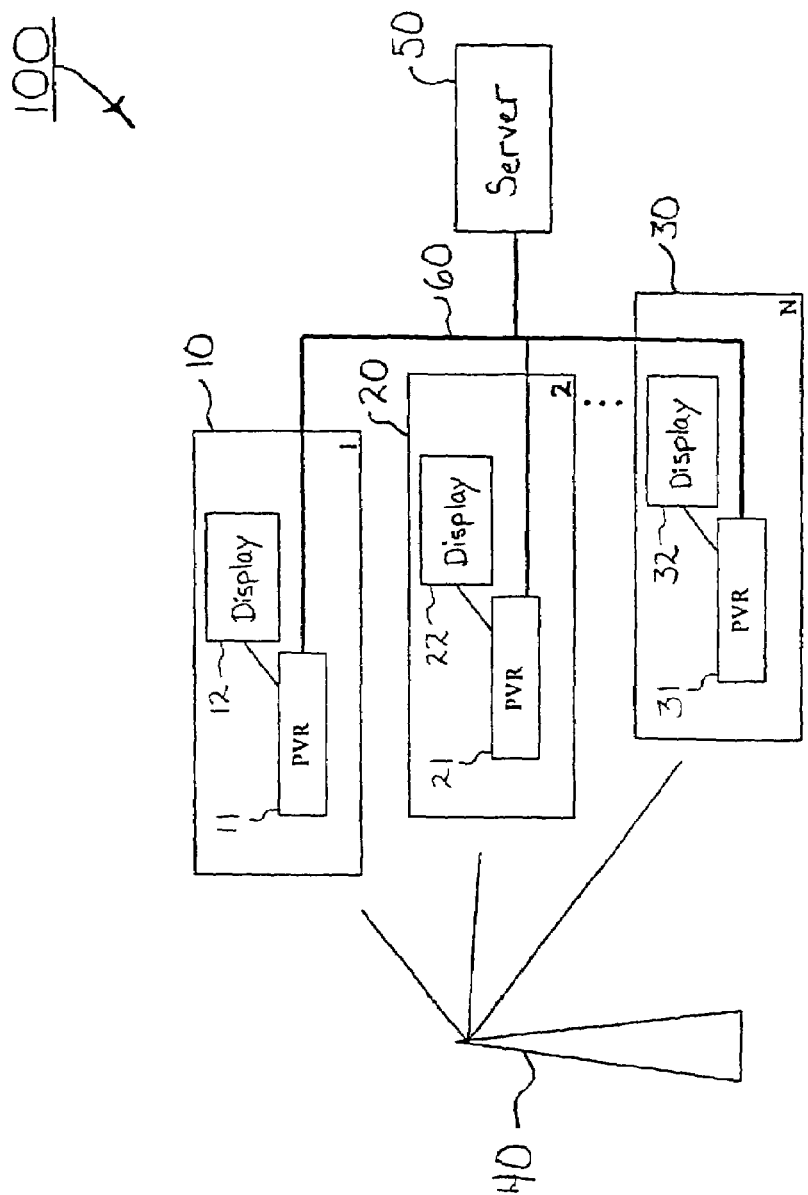
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises a plurality of exemplary user systems 10, 20, 30, a data transmission source 40, a server 50, and a communication link 60. For purposes of explanation and example, environment 100 is shown as including only three user systems (i.e., 1, 2 . . . N). In practice, however, it is contemplated that any number of such user systems will be included in environment 100. For example, there may be one or more such user systems associated with a given household.

According to an exemplary embodiment, each user system 10, 20, 30 comprises a personal video recorder ("PVR") 11, 21, 31, and a display device 12, 22, 32, respectively, and is capable of, among other things, receiving, recording and displaying data. Each display device 12, 22, 32 includes a variable visual display terminal and may, for example, be embodied as a television signal receiver, monitor or other device. Further details regarding PVRs 11, 21, 31 will be provided later herein with reference to FIG. 2.

According to an exemplary embodiment, data transmission source 40 transmits data such as video, audio, internet and/or other data in digital and/or analog format to each of the plurality of user systems 10, 20, 30. Data transmission source 40 may, for example, transmit data via terrestrial, cable, satellite, fiber optic, digital subscriber line ("DSL"), ethernet and/or other type of broadcast and/or multicast means.

According to an exemplary embodiment, server 50 is operatively coupled to each user system 10, 20, 30 via communication link 60 such as a telephone, cable, fiber optic, DSL, ethernet, wireless and/or other link. Server 50 is capable of, among other things, receiving and compiling information from user systems 10, 20, 30 indicative of their commercial viewing preferences. In the event that environment 100 is large and distributed, there may be a plurality of such servers 50, each servicing a particular portion of environment 100. Moreover, the functions of data transmission source 40 and server 50 as described herein may be combined into a single source for transmitting and receiving data.

In an exemplary mode of operation, data transmission source 40 transmits program data (e.g., one or more television programs) including one or more commercials and information identifying each commercial. According to an exemplary embodiment, the information identifying a given commercial comprises a digital code that is included, for example, within the vertical blanking interval ("VBI") of an analog video signal, or within one or more data packets of a digital video signal. As will be discussed later herein, the digital code represents one or more parameters which enable a given commercial to be identified.

At least one PVR 11, 21, 31 receives the program data including the one or more commercials and corresponding identification information from data transmission source 40, and records the same based on user inputs. As is known in the art, each PVR 11, 21, 31 is capable of recording program data wherein a user designates through inputs starting and ending points of the program data to be recorded. In this manner, a user may designate for recording only those portions of the program data that may be of interest.

After recording, at least one PVR 11, 21, 31 plays back the recorded program data including the one or more commercials. During playback, at least one PVR 11, 21, 31 detects whether a trigger event occurs for any of the one or more commercials. As used herein, a "trigger event" refers to one or more user actions that may indicate or suggest the user's desire or intention to view and/or listen to a previously recorded commercial. As will be explained later herein, various different user actions may constitute a trigger event.

In the event that a trigger event is detected for a given commercial, at least one PVR 11, 21, 31 stores information identifying the given commercial. This may be performed, for example, by redundantly storing the commercial identification information (e.g., digital code) previously transmitted from data transmission source 40 and recorded by PVR 11, 21, 31. Alternatively, this may be performed by storing information that refers to the commercial identification information previously transmitted from data transmission source 40 and recorded by PVR 11, 21, 31. For example, the stored commercial identification information may comprise a memory pointer that points to a memory address containing the commercial identification information previously recorded by PVR 11, 21, 31. Regardless of its specific form, the stored commercial identification information clearly identifies a given commercial for which a trigger event has been detected. According to an exemplary embodiment, commerical identification information may not be utilized by users of PVR 11, 21, 31 to avoid playback of recorded commercials.

PVR 11, 21, 31 periodically transmits commercial identification information to a predetermined location, such as server 50, where the information can be used to identify the commercial(s) for which a trigger event has been detected. According to an exemplary embodiment, PVR 11, 21, 31 transmits the commercial identification information that was previously transmitted from data transmission source 40 and recorded by PVR 11, 21, 31. According to an exemplary embodiment, server 50 receives and compiles the commercial identification information, and provides such information to its respective sponsors. The sponsors can then use the commercial identification information, for example, to evaluate the effectiveness of their commercials. Further details regarding the operation of elements within environment 100 will be provided later herein.

Figure 2:
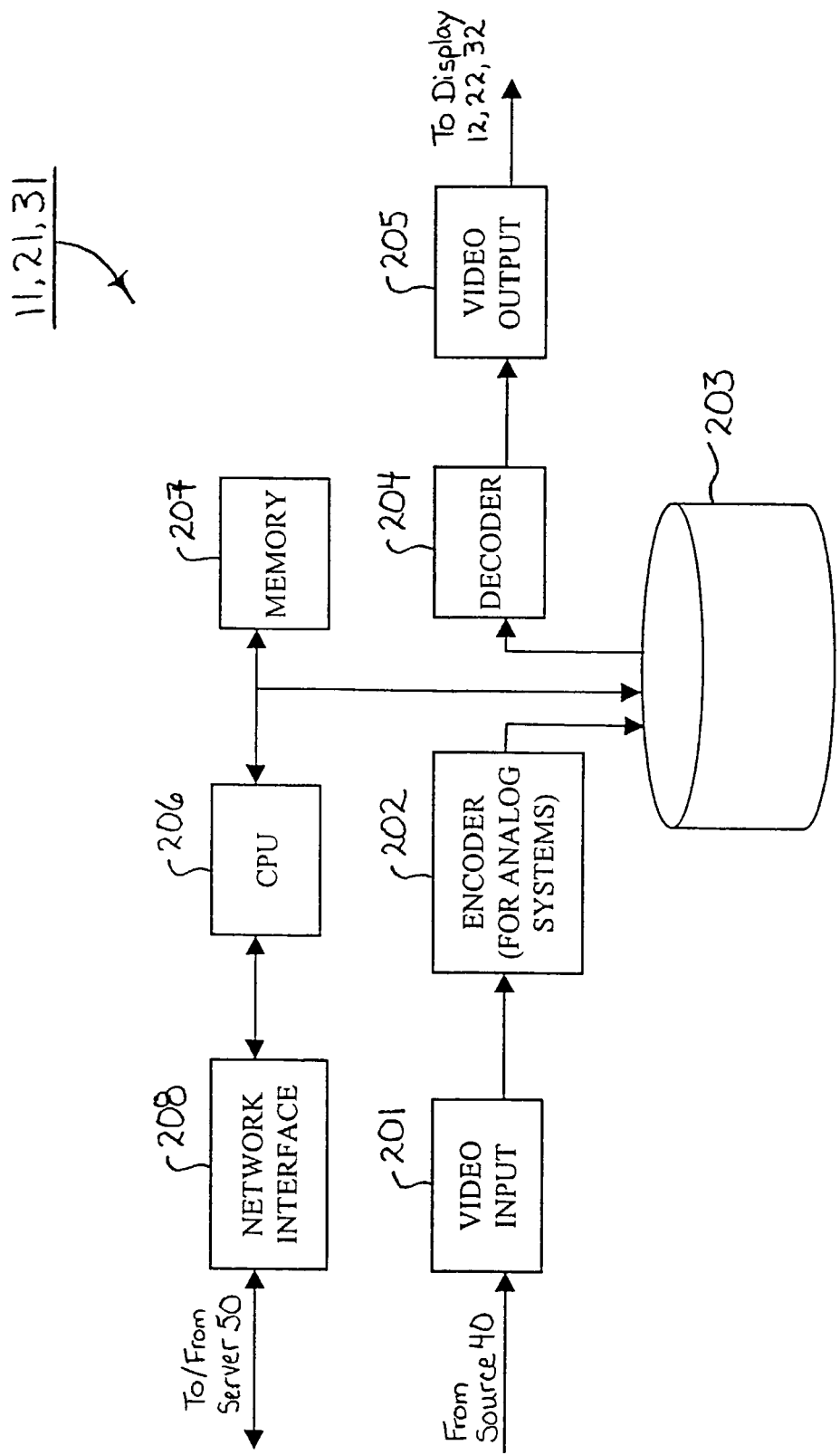
FIG. 2 is a diagram of an exemplary personal video recorder ("PVR") of FIG. 1.

Referring now to FIG. 2, further details of an individual PVR 11, 21, 31 of FIG. 1 are shown. Note that the details shown in FIG. 2 are merely exemplary, and are not intended to be limiting in any manner. Moreover, PVR 11, 21, 31 of FIG. 2 is shown, and will be described, with a primary emphasis on video data. However, it will be intuitive to those skilled in the art that other types of data (e.g., audio, internet, etc.) may also be accommodated. It is contemplated that PVR 11, 21, 31 shown in FIG. 2 may be constructed using a commercially-available PVR, such as an RCA branded PVR, although each PVR 11, 21, 31 of FIG. 1 may be from a different manufacturer.

In FIG. 2, a video input unit 201 receives from data transmission source 40 digital and/or analog video program data including one or more commercials and information identifying each commercial, and processes the same in a known manner to generate and output processed program data. An encoder 202 receives the processed program data output from video input unit 201, and selectively performs an encoding operation upon the received program data. In particular, when the program data output from video input unit 201 is in an analog format or an undesired digital format, encoder 202 performs an encoding operation to convert the analog or digital program data to a predetermined digital format. Alternatively, when the program data output from video input unit 201 is already in the predetermined digital format, no encoding operation by encoder 202 may be necessary.

A non-volatile storage unit 203, such as a hard disk drive or other storage medium, receives and stores data such as the digital program data provided from encoder 202. A decoder 204 performs a decoding operation upon program data stored in non-volatile storage unit 203 to enable playback of the program data. A video output unit 205 receives decoded program data output from decoder 204, and performs a processing operation thereon in a known manner to generate and output processed program data for playback. Outputs from video output unit 205 are provided to display 12, 22, 32 of FIG. 1.

A central processing unit ("CPU") 206 controls the general operations of PVR 11, 21, 31. For example, CPU 206 receives user inputs via an input terminal such as a hand-held remote control unit or other input means (not shown), and based on the user inputs, enables selected portions of received program data to be recorded in non-volatile storage unit 203. Moreover, CPU 206 detects user inputs that constitute a trigger event for a given commercial during playback of recorded program data, and enables information identifying the given commercial to be stored in, for example, non-volatile storage unit 203 in response to detection of the trigger event.

A memory 207 stores data, such as operating system data, file management data, and application program data, which is selectively retrieved and utilized by CPU 206 in a known manner during operation of PVR 11, 21, 31. A network interface unit 208 also communicates with CPU 206, and enables data to be exchanged with server 50 under the control of CPU 206. For example, network interface unit 208 enables commercial identification information to be transmitted to server 50 under the control of CPU 206.

Figure 3:
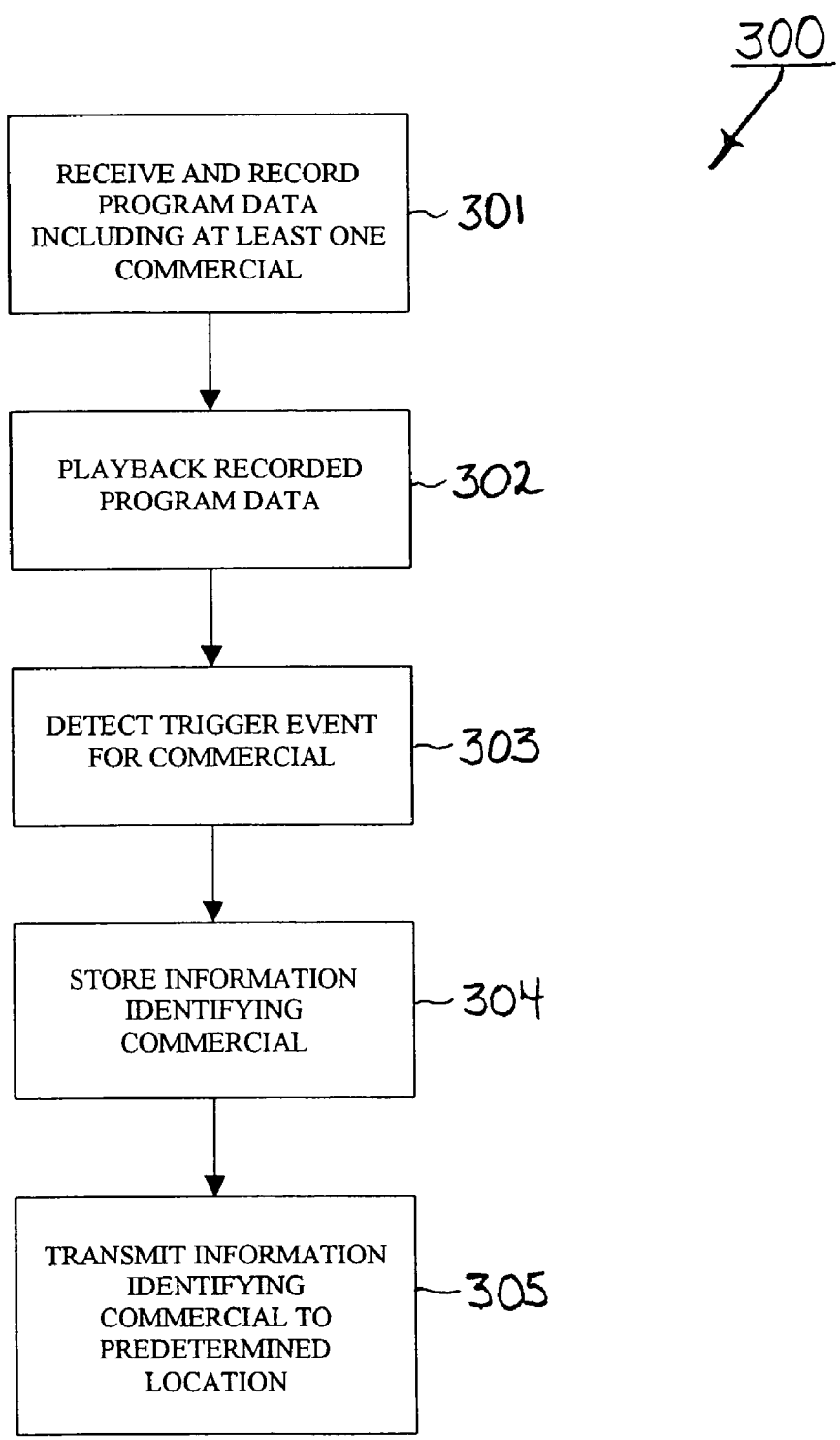
FIG. 3 is a flowchart illustrating exemplary steps for carrying out the present invention.

Referring now to FIG. 3, a flowchart 300 illustrating exemplary steps for carrying out the present invention is shown. For purposes of example and explanation, the steps of FIG. 3 will be described with reference to environment 100 of FIG. 1, and more particularly, to only one user system 10, 20, 30 and associated PVR 11, 21, 31. In practice, however, the steps of FIG. 3 may be performed by more than one user system 10, 20, 30 and associated PVR 11, 21, 31. Accordingly, the steps of FIG. 3 are merely exemplary, and are not intended to limit the present invention in any manner.

At step 301, a given PVR 11, 21, 31 receives from data transmission source 40 program data (e.g., one or more television programs) including at least one commercial and information identifying each commercial, and records the same in non-volatile storage unit 203 in response to user inputs. As previously indicated herein, the information identifying a given commercial may, for example, comprise a digital code that is included within the VBI of an analog video signal, or within one or more data packets of a digital video signal. The digital code may, for example, identify a given commercial by title, sponsor name and/or other parameter, such as a time stamp indicating when the given commercial was transmitted from data transmission source 40.

Figure 4:
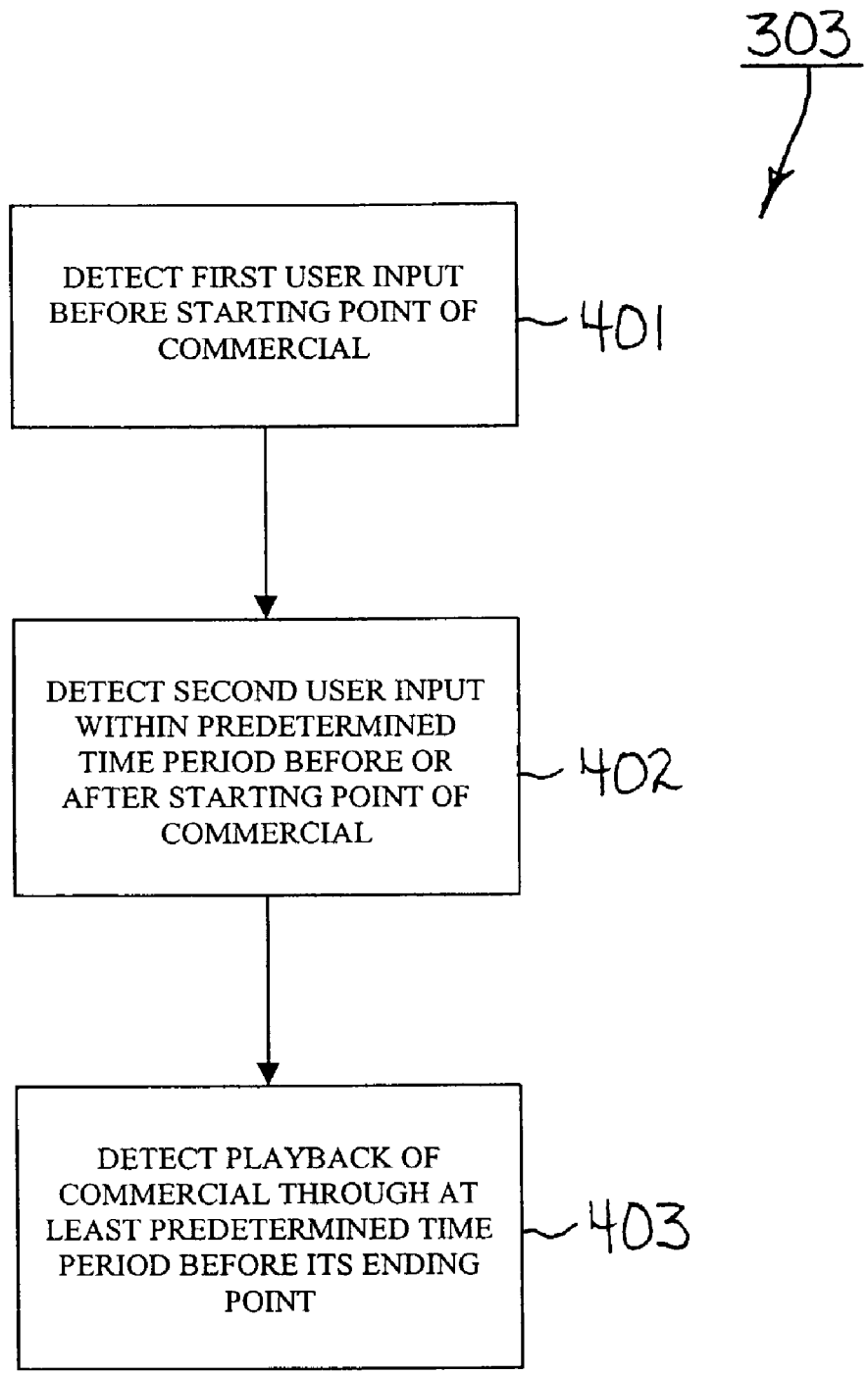
FIG. 4 is a flowchart illustrating exemplary steps for detecting a trigger event for a commercial according to a first embodiment of the present invention.
Figure 5:
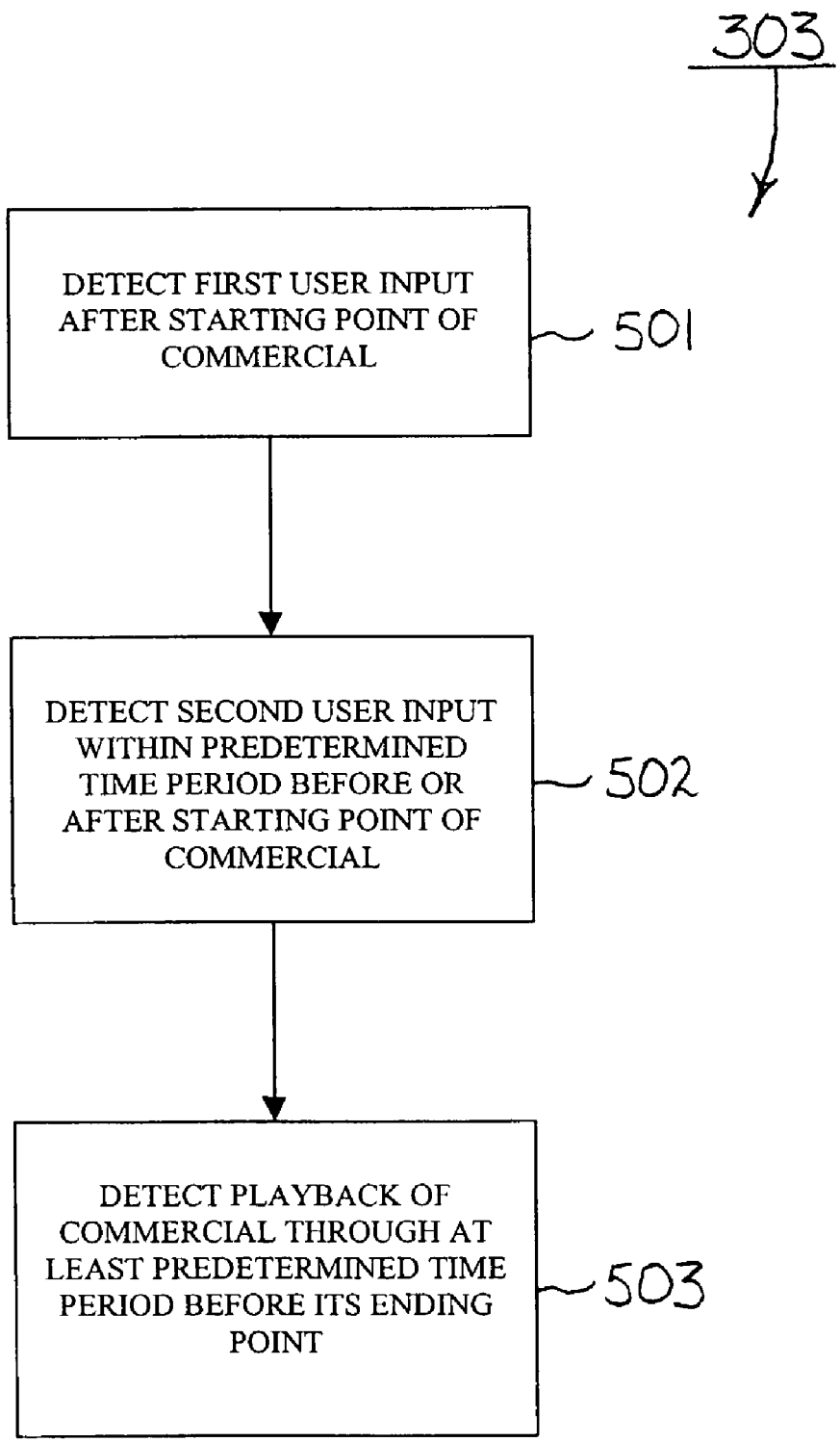
FIG. 5 is a flowchart illustrating exemplary steps for detecting a trigger event for a commercial according to a second embodiment of the present invention.
Figure 6:
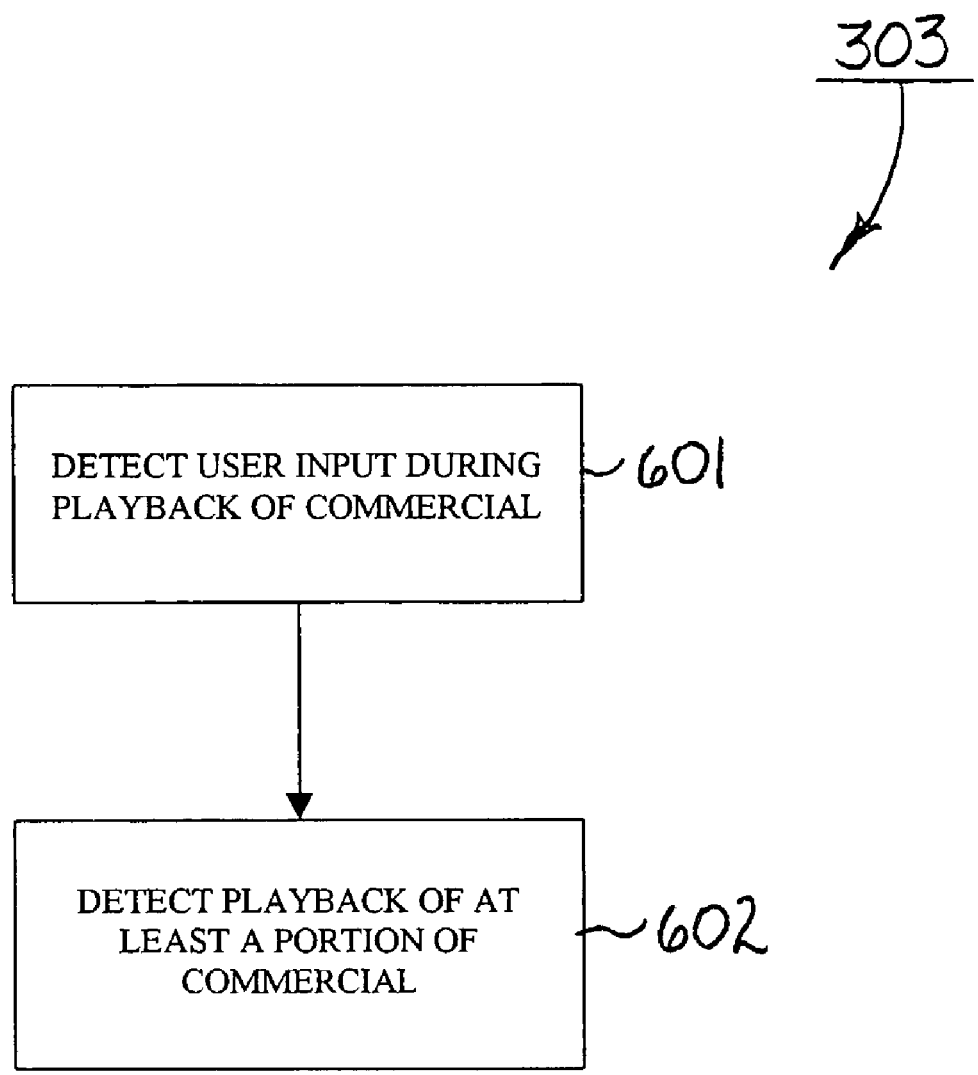
FIG. 6 is a flowchart illustrating exemplary steps for detecting a trigger event for a commercial according to a third embodiment of the present invention.

After recording the program data including at least one commercial and information identifying each commercial at step 301, process flow advances to step 302 where PVR 11, 21, 31 plays back the recorded program data including the at least one commercial. During playback, CPU 206 of PVR 11, 21, 31 detects a trigger event for a given commercial at step 303. As previously indicated herein, a trigger event refers to one or more user actions that may indicate or suggest the user's desire or intention to view and/or listen to a previously recorded commercial. A variety of different user actions may constitute a trigger event according to the present invention. Three examples of such user actions are illustrated in FIGS. 4 to 6, respectively. These three examples are merely illustrative, and are not intended to be exhaustive or limiting. Accordingly, other types of user actions than those represented in FIGS. 4 to 6 may also constitute a trigger event according to the present invention.

Referring to FIG. 4, a flowchart illustrating exemplary steps for detecting a trigger event for a commercial at step 303 of FIG. 3 according to a first embodiment of the present invention is shown. At step 401 of FIG. 4, CPU 206 of PVR 11, 21, 31 detects a first user input before a starting point of the given commercial. According to this exemplary embodiment, the first user input is either a fast forward command, a skip command, or other command which causes PVR 11, 21, 31 to advance forward towards the given commercial at a speed greater than a normal (i.e., 1×) playback speed. Accordingly, when the first user input is detected at step 401, this may indicate or suggest that a user wants to quickly move forward through the recorded program data in order to view the given commercial from its starting point.

After the first user input is detected at step 401, process flow advances to step 402 where CPU 206 of PVR 11, 21, 31 detects a second user input within a predetermined time period before or after the starting point of a recorded commercial. According to this exemplary embodiment, the second user input is a play command or other command which causes PVR 11, 21, 31 to play back the recorded commercial at normal (i.e., 1×) playback speed. Also according to this exemplary embodiment, the predetermined time period utilized for detecting the second user input at step 402 is 5 seconds before or after the starting point of the recorded commercial. Other time periods may of course be used in accordance with the present invention. Accordingly, when the second user input is detected at step 402, this may indicate or suggest that a user wants to begin normal playback of the recorded commercial at a point that is relatively close to its starting point.

Then, after the second user input is detected at step 402, process flow advances to step 403 where CPU 206 of PVR 11, 21, 31 detects that the recorded commercial has been played back through at least a predetermined time period before its ending point. According to this exemplary embodiment, the predetermined time period utilized at step 403 is 5 seconds before the ending point of the recorded commercial. Other time periods may of course be used in accordance with the present invention. Accordingly, when playback of the recorded commercial is detected in the aforementioned manner at step 403, this may indicate or suggest that a user has viewed most of the commercial.

Referring to FIG. 5, a flowchart illustrating exemplary steps for detecting a trigger event for a commercial at step 303 of FIG. 3 according to a second embodiment of the present invention is shown. At step 501 of FIG. 5, CPU 206 of PVR 11, 21, 31 detects a first user input after a starting point of a recorded commercial. According to this exemplary embodiment, the first user input is a reverse command, a replay command, or other command which causes PVR 11, 21, 31 to proceed in a reverse manner towards the starting point of the recorded commercial at a speed greater than a normal (i.e., 1×) playback speed. Accordingly, when the first user input is detected at step 501, this may indicate or suggest that a user wants to move quickly to the starting point of the recorded commercial in order to view the commercial. After the first user input is detected at step 501, process flow advances to step 502 where CPU 206 of PVR 11, 21, 31 detects a second user input within a predetermined time period before or after the starting point of the recorded commercial. According to this exemplary embodiment, the second user input is a play command or other command which causes PVR 11, 21, 31 to play back the recorded commercial at normal (i.e., 1×) playback speed. Also according to this exemplary embodiment, the predetermined time period utilized for detecting the second user input at step 502 is 5 seconds before or after the starting point of the recorded commercial. Other time periods may of course be used in accordance with the present invention. Accordingly, when the second user input is detected at step 502, this may indicate or suggest that a user wants to begin normal playback of the recorded commercial at a point that is relatively close to its starting point.

Then, after the second user input is detected at step 502, process flow advances to step 503 where CPU 206 of PVR 11, 21, 31 detects that the recorded commercial has been played back through at least a predetermined time period before its ending point. According to this exemplary embodiment, the predetermined time period utilized at step 503 is 5 seconds before the ending point of the recorded commercial. Other time periods may of course be used in accordance with the present invention. Accordingly, when playback of the recorded commercial is detected in the aforementioned manner at step 503, this may indicate or suggest that a user has viewed most of the commercial.

Referring to FIG. 6, a flowchart illustrating exemplary steps for detecting a trigger event for a commercial at step 303 of FIG. 3 according to a third embodiment of the present invention is shown. At step 601 of FIG. 6, CPU 206 of PVR 11, 21, 31 detects a user input during playback of a recorded commercial. According to this exemplary embodiment, the user input is a reverse command, a replay command, or other command which causes PVR 11, 21, 31 to proceed in a reverse manner towards a starting point of the recorded commercial at a speed greater than a normal (i.e., 1×) playback speed. Accordingly, when the user input is detected at step 601, this may indicate or suggest that a user wants to move quickly to the starting point of the recorded commercial in order to view the commercial.

Then, after the user input is detected at step 601, process flow advances to step 602 where CPU 206 of PVR 11, 21, 31 detects playback of at least a portion of the recorded commercial. Accordingly, when playback of the recorded commercial is detected at step 602, this may indicate or suggest that a user intends or desires to view the commercial.

As previously indicated herein, FIGS. 4 to 6 illustrate only three examples of user actions that constitute a trigger event according to the present invention. Accordingly, other types of user actions than those represented in FIGS. 4 to 6 may also constitute a trigger event according to the present invention. For example, a trigger event may be detected when a recorded commercial is played back without occurrence of a user input such as a fast forward command, a skip command, or other command that causes PVR 11, 21, 31 to avoid the commercial. Accordingly, the type of user actions that constitute a trigger event may be a matter of design choice.

Referring now back to FIG. 3, after a trigger event for a recorded commercial is detected at step 303, process flow advances to step 304 where CPU 206 of PVR 11, 21, 31 causes information identifying the given commercial to be stored in non-volatile storage unit 203 or memory 207. As previously indicated herein, step 304 may for example be performed by redundantly storing the commercial identification information (e.g., digital code) previously transmitted from data transmission source 40 and recorded by PVR 11, 21, 31. Alternatively, step 304 may be performed by storing information that refers to the commercial identification information previously transmitted from data transmission source 40 and recorded by PVR 11, 21, 31 at step 301. For example, the stored commercial identification information may comprise data that points to a memory address in non-volatile storage unit 203 containing the commercial identification information previously recorded by PVR 11, 21, 31 at step 301. According to an exemplary embodiment, commercial identification information may not be utilized by users of PVR 11, 21, 31 to avoid playback of recorded commercials.

Then, at step 305, PVR 11, 21, 31 transmits via network interface 208 the commercial identification information to a predetermined location, such as server 50, where the information can be used to identify the commercial for which a trigger event has been detected. According to an exemplary embodiment, PVR 11, 21, 31 transmits the commercial identification information that was previously transmitted from data transmission source 40 and recorded by PVR 11, 21, 31 at step 301. According to an exemplary embodiment, PVR 11, 21, 31 may transmit such commercial identification information to server 50 via communication link 60 on a periodic basis, such daily, weekly, monthly, etc. Such transmission may for example be performed automatically, or in response to a request from server 50. Server 50 receives the commercial identification information from PVR 11, 21, 31, and according to an exemplary embodiment, compiles and stores the received information with other commercial identification information received from one or more other PVRs 11, 21, 31. Server 50 may, for example, compile and store the commercial identification information based on viewer name and/or address (e.g., mailing and/or internet address), sponsor name, time of commercial transmission from data transmission source 40, time that commercial identification information is received by server 50, viewing channel, and/or other parameters.

Server 50 may also distribute the commercial identification information to its respective sponsors, and thereby enable the sponsors to evaluate the effectiveness of their commercials. For example, such commercial identification information may enable sponsors to determine what percentage of viewers singled out their commercials, and the identity and/or address of those viewers. Sponsors may then provide those viewers with advertising literature, coupons, electronic mail, and/or other targeted advertising for the products and/or services advertised in the commercials identified by the commercial identification information. The commercial identification information may also be distributed (e.g., sold) to sponsors' competitors as a source of competitive intelligence.

As described herein, the present invention advantageously enables the generation and distribution of commercial viewing and/or listening information. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for generating commercial information using a data recording device, the method comprising steps of:

recording program data including at least one commercial;

playing back the recorded program data including the at least one commercial;

detecting a trigger event for the at least one commercial during playback;

wherein the trigger event for the at least one commercial is detected in response to steps comprising:

detecting a first user input before a starting point of the at least one commercial, the first user input comprising one of a fast forward command and a skip command;

detecting a second user input within a first predetermined time period before or after the starting point of the at least one commercial, the second user input comprising a play command;

detecting playback of the at least one commercial through at least a second predetermined time period before an ending point of the at least one commercial; and storing information identifying the at least one commercial in response to detection of the trigger event.

2. The method of claim 1, further comprising a step of transmitting information identifying the at least one commercial to a predetermined location.

3. The method of claim 2, further comprising steps of:
receiving the information identifying the at least one commercial at the predetermined location; and
distributing the information identifying the at least one commercial to at least one sponsors.

4. The method of claim 1, wherein the program data comprises video data.

5. The method of claim 1, wherein the program data comprises audio data.

6. The method of claim 1, wherein the information identifying the at least one commercial comprises a digital code.

7. The method of claim 6, wherein the digital code comprises a time stamp indicating when the at least one commercial was transmitted from a data transmission source.

8. A method for generating commercial information using a data recording device, the method comprising steps of:
recording program data including at least one commercial;
playing back the recorded program data including the at least one commercial;
detecting a trigger event for the at least one commercial during playback;
wherein the trigger event for the at least one commercial is detected in response to steps comprising:
detecting a first user input after a starting point of the at least one commercial, the first user input comprising one of a reverse command and a replay command;
detecting a second user input within a first predetermined time period before or after the starting point of the at least one commercial, the second user input comprising a play command; and
detecting playback of the at least one commercial through at least a second predetermined time period before an ending point of the at least one commercial; and
storing information identifying the at least one commercial in response to detection of the trigger event.

9. An apparatus comprising:
means for recording program data including at least one commercial;
means for enabling playback of the recorded program data including the at least one commercial;
means for detecting a trigger event for the at least one commercial during playback, and for enabling information identifying the at least one commercial to be stored in response to detection of the trigger event;
wherein the detecting means detects the trigger event for the at least one commercial by:
detecting a first user input before a starting point of the at least one commercial, the first user input comprising one of a fast forward command and a skip command;
detecting a second user input within a first predetermined time period before or after the starting point of the at least one commercial, the second user input comprising a play command; and
detecting playback of the at least one commercial through at least a second predetermined time period before an ending point of the at least one commercial.

10. The apparatus of claim 9, further comprising means for enabling transmission of information identifying the at least one commercial to a predetermined location.

11. The apparatus of claim 9, wherein the program data comprises video data.

12. The apparatus of claim 9, wherein the program data comprises audio data.

13. The apparatus of claim 9, wherein the information identifying the at least one commercial comprises a digital code.

14. The apparatus of claim 13, wherein the digital code comprises a time stamp indicating when the at least one commercial was transmitted from a data transmission source.

15. An apparatus comprising:
means for recording program data including at least one commercial;
means for enabling playback of the recorded program data including the at least one commercial;
means for detecting a trigger event for the at least one commercial during playback, and for enabling information identifying the at least one commercial to be stored in response to detection of the trigger event;
wherein the detecting means detects the trigger event for the at least one commercial by:
detecting a first user input after a starting point of the at least one commercial, the first user input comprising one of a reverse command and a replay command;
detecting a second user input within a first predetermined time period before or after the starting point of the at least one commercial.

16. A data recording device comprising:
a storage medium operative to record program data including at least one commercial;
a decoder operative to enable playback of the recorded program data including the at least one commercial; and
a processor operative to detect a trigger event for the at least one commercial during playback, and enable information identifying the at least one commercial to be stored in response to detection of the trigger event;
wherein the processor detects the trigger event for the at least one commercial by detecting a first user input before a starting point of the at least one commercial, the first user input comprising one of a fast forward command and a skip command;
detecting a second user input within a first predetermined time period before or after the starting point of the at least one commercial, the second user input comprising a play command; and
detecting playback of the at least one commercial through at least a second predetermined time period before an ending point of the at least one commercial.

17. The data recording device of claim 16, further comprising an interface operative to enable transmission of information identifying the at least one commercial to a predetermined location.

18. The data recording device of claim 16, wherein the program data comprises video data.

19. The data recording device of claim 16, wherein the program data comprises audio data.

20. The data recording device of claim 16, wherein the information identifying the at least one commercial comprises a digital code.

21. The data recording device of claim 20, wherein the digital code comprises a time stamp indicating when the at least one commercial was transmitted from a data transmission source.

22. A data recording device comprising:
- a storage medium operative to record program data including at least one commercial;
- a decoder operative to enable playback of the recorded program data including the at least one commercial; and
- a processor operative to detect a trigger event for the at least one commercial during playback, and enable information identifying the at least one commercial to be stored in response to detection of the trigger event;

wherein the processor detects the trigger event for the at least one commercial by:
- detecting a first user input after a starting point of the at least one commercial, the first user input comprising one of a reverse command and a replay command;
- detecting a second user input within a first predetermined time period before or after the starting point of the at least one commercial, the second user input comprising a play command; and
- detecting playback of the at least one commercial through at least a second predetermined time period before an ending point of the at least one commercial.

* * * * *